Jan. 7, 1930. C. H. SCHMALZ 1,742,828
FLUID FLOW CONTROLLING VALVE
Filed Jan. 24, 1928 5 Sheets-Sheet 3
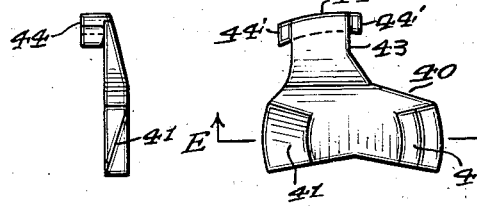
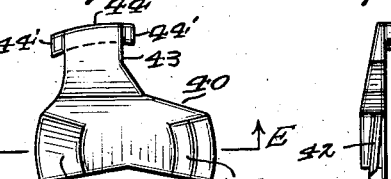
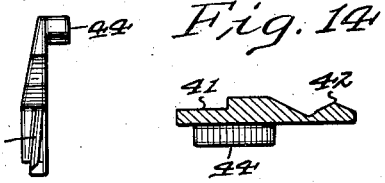
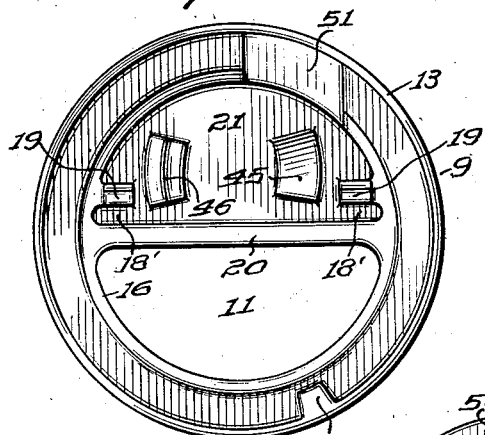
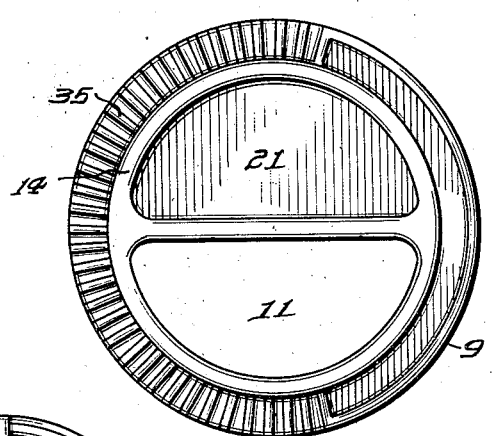
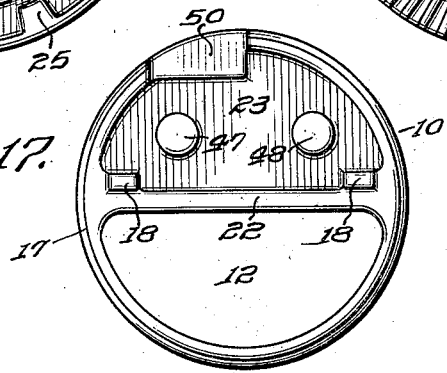
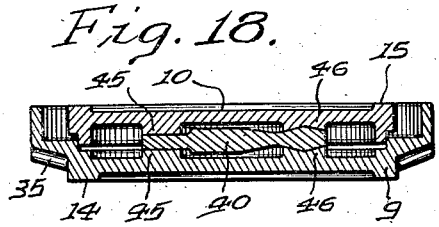
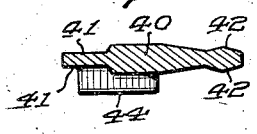
INVENTOR
Charles H. Schmalz.
BY
ATTORNEYS
WITNESS

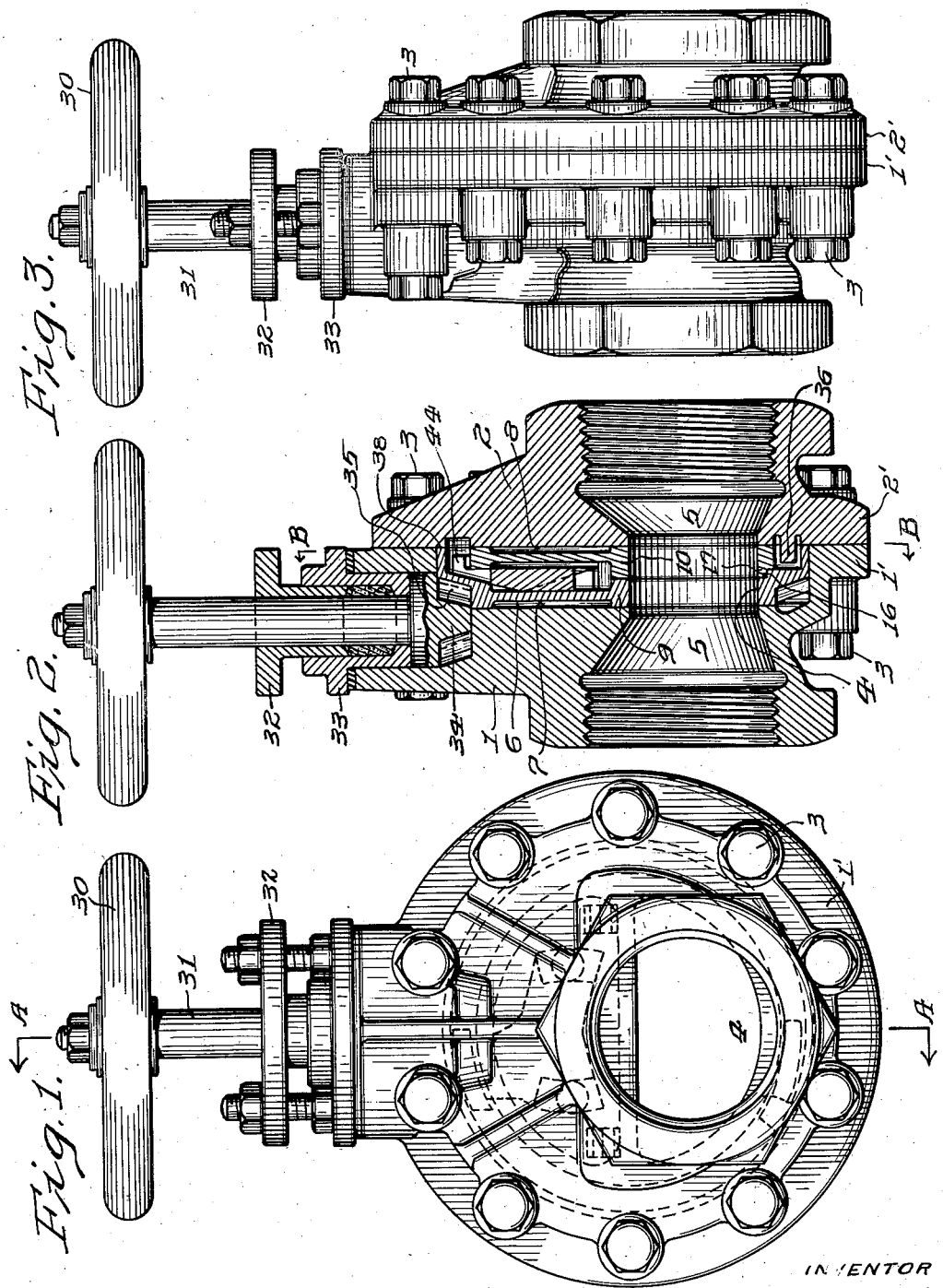

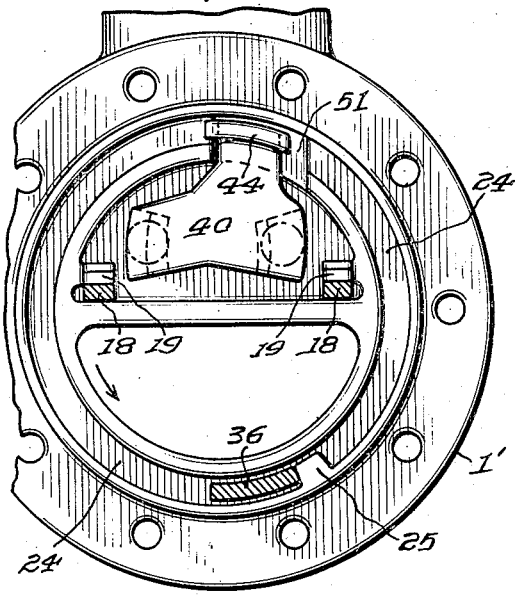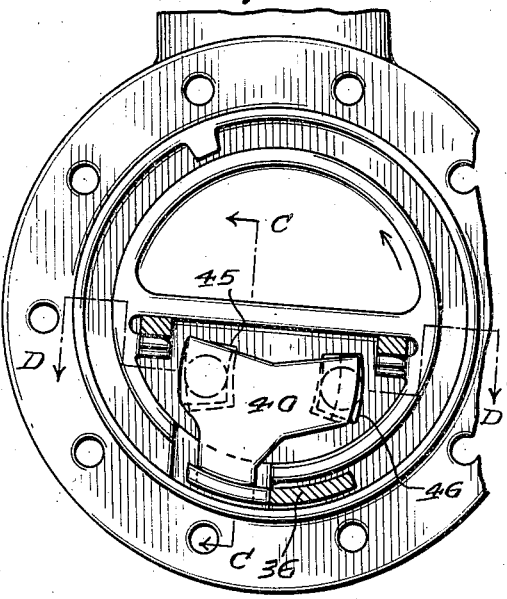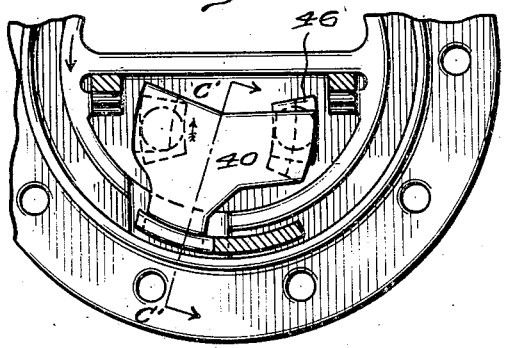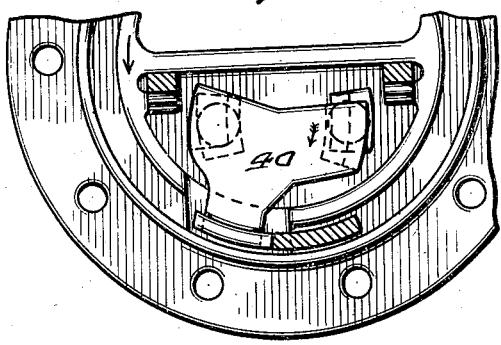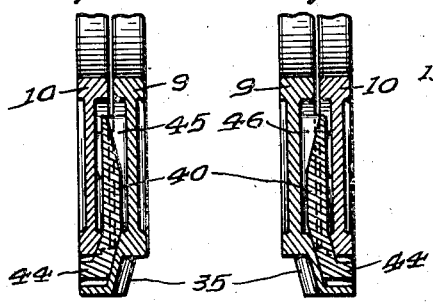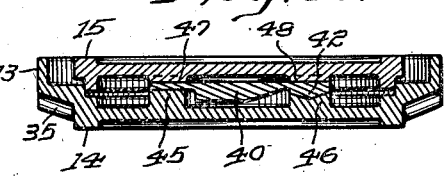

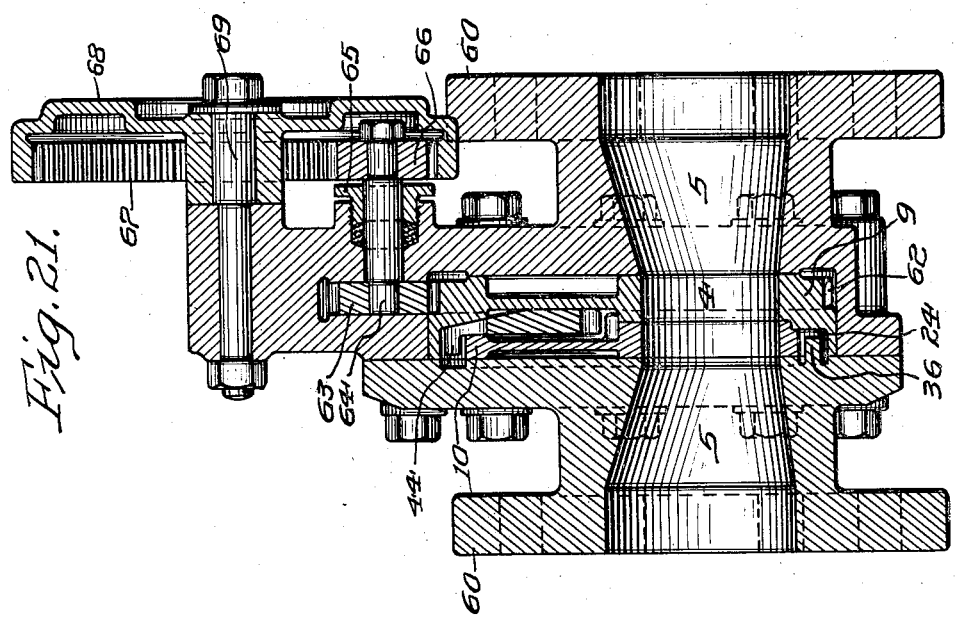
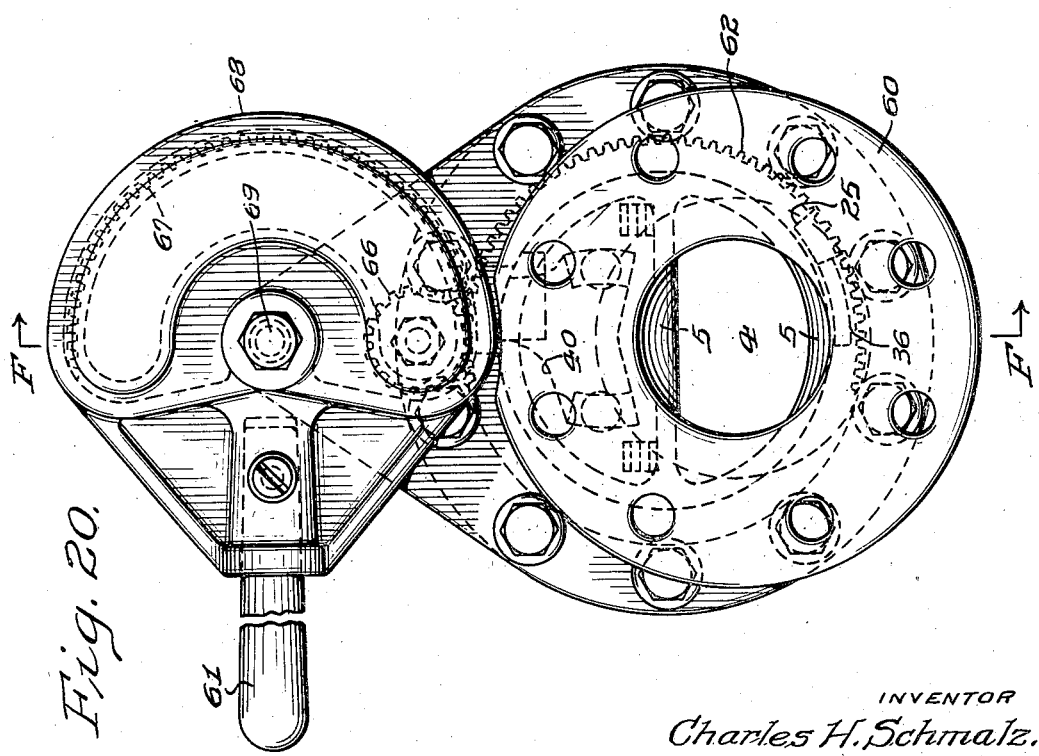

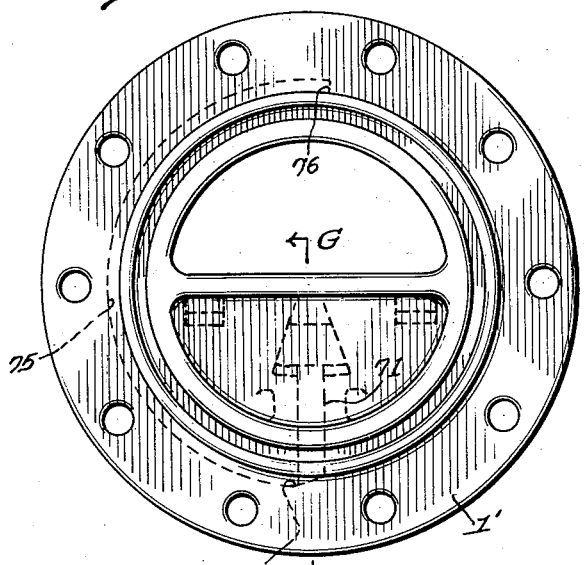
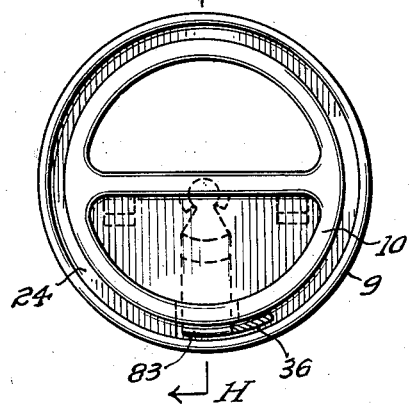
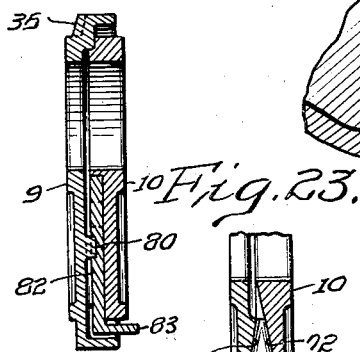
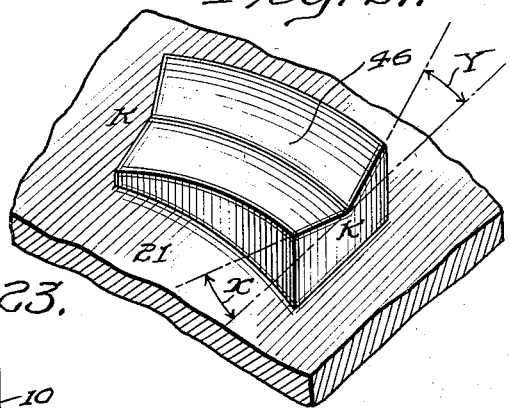
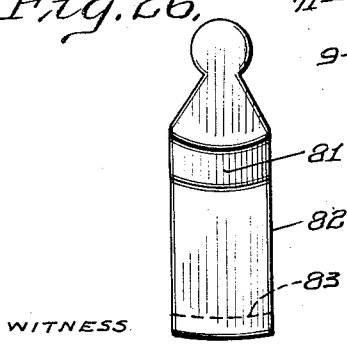
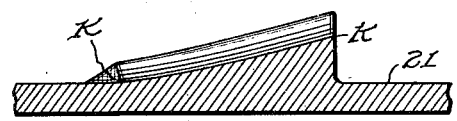

Patented Jan. 7, 1930

1,742,828

UNITED STATES PATENT OFFICE

CHARLES H. SCHMALZ, OF PHILADELPHIA, PENNSYLVANIA, ASSIGNOR TO ROTEX VALVE COMPANY, OF PHILADELPHIA, PENNSYLVANIA, A CORPORATION OF DELAWARE

FLUID-FLOW-CONTROLLING VALVE

Application filed January 24, 1928. Serial No. 249,000.

The present invention relates more particularly to valves for controlling the flow of fluids such as water, steam, air, gas and so forth, through orifices, pipes and the like.

In U. S. Letters Patent No. 1,278,760, granted to me September 10, 1918, I disclosed and claimed a valve intended for a similar purpose and which included, among other things, a pair of ported disk-like members so arranged as to be capable of relative movement with respect to each other about a common axis, in association with means operative through such relative movement to force the disks apart axially after they are brought to a position to close the passage through the valve so as to press the outer faces of the disks against suitable surfaces formed on the body of the valve to thereby effect a positive seal between these cooperating parts with consequent prevention of leakage through the valve.

The present invention contemplates the provision of a valve of generally similar character, adapted for like uses and embodying means for effecting a similar positive and adequate seal. However, in the present invention, instead of bringing about the sealing action by relative rotation of the disks which operates to produce cooperative action between wedging or camming means carried thereby so as to wedge the disks axially apart, I arrange the disks so they will rotate as a unit as they are turned from open to closed position and vice versa and provide a wedge-like member which is carried by, yet relatively movable with respect to, the disks and which in cooperation with one or more wedging surfaces carried by one or both disks is operative through the turning movement of the disks to force the latter axially apart at the proper time to form the seal. Additionally, in accordance with the preferred practice of the present invention, the several parts are so arranged that a sliding contact, as distinguished from a sealing one, is maintained between the disks and the cooperating seating surfaces in the body throughout the major portion of the movement of the disks in either direction, in consequence of which the cooperating surfaces of the body and of the disks are constantly maintained in clean and proper condition and entrance between the said surfaces of particles of grit or other foreign matter which may be contained in the fluid passing through the valve is effectually prevented. In certain respects, therefore, the present invention may be regarded as an improvement upon that forming the subject of my said patent for the reason, among others, that valves constructed in accordance therewith embody all of the advantages of the latter, as well as additional advantages, improvements and desirable features as will hereinafter more fully appear.

A principal object of my invention, therefore, is to provide a fluid controlling valve embodying a pair of rotatable ported elements arranged to be positively rotated from one position to another to open and close the valve in combination with means operative through the rotation of said elements to effectually and positively seal the valve against leakage therethrough when said elements are in a position to close the valve, and to so arrange and coordinate the various parts as to prevent the sealing of the valve prematurely.

A further object of the invention is to provide a valve of the character of that to which reference has just been made and embodying a wedge-like member movable with, yet relatively movable with respect to, the rotatable elements or disks, as they may conveniently be termed, and which is cooperative with one or more wedging surfaces carried by one or both of the disks in such manner that the wedge-like member is free to progressively and automatically select its bearing or bearings upon said surfaces according to the resistance encountered by it at any particular moment while effecting its wedging function, with the result that the disks are sealed against the sealing surfaces in the body of the valve with a substantially uniform pressure throughout the area of contact and with a minimum amount of axial separation.

A still further object of the invention is to so construct and arrange the various parts of the valve that the pressure with which the disks are axially separated during the sealing operation is under the control of the operator and may be progressively increased by continued rotative movement of the disks until the maximum desired sealing pressure is obtained, as well as to insure a continuance of that pressure with corresponding immobility of the parts irrespective of the occurrence of extraneous conditions or factors such as vibrations in the line or pulsations of the fluid therein until the seal is intentionally broken by imparting to the disks a very slight rotative movement in the opposite or opening direction to thereby enable the wedge-like member to automatically adjust itself to relieve the sealing pressure and effect and maintain a sliding pressure or contact between the disks and the sealing surfaces of the valve body, this sliding contact being thus renewed after each closing and sealing of the valve and when so renewed being thereafter preserved throughout subsequent movement of the disks until the latter are again sealed against the valve body.

It will further be understood that, as in the case of the valve disclosed in my said patent, a primary object of the present invention is to provide a valve of such construction that, irrespective of the position in which the valve may be installed, it is impossible for sand, pebbles, gravel or other heavy particles or the like contained in or entrained with the fluid which the valve is arranged to control to settle or accumulate in depressions, pockets or the like in the valve body and thus interfere with the proper functioning of the valve and, additionally, to so construct and arrange the various parts as to prevent the entrance of grit or other foreign matter between the cooperative surfaces of the valve body and the rotatable disks.

My invention further includes other objects, advantages and novel features of construction and arrangement to which reference is hereinafter made or which will be apparent from the following description of certain forms of the invention as illustrated in the accompanying drawings.

In the said drawings Fig. 1 is an end view of one form of valve constructed in accordance with the present invention; Fig. 2 is a vertical section thereof on line A—A in Fig. 1 looking in the direction of the arrows and Fig. 3 is a side view of the valve. Figs. 4 to 7 inclusive are fragmentary vertical sections taken substantially on the plane indicated by the line B—B in Fig. 2 but with the driven disk, hereinafter more fully described, removed; these views are more especially intended to indicate various positions consecutively assumed by certain of the parts while the valve is being closed and sealed. Figs. 8 and 9 are respectively fragmentary sections on lines C—C of Fig. 5 and C'—C' in Fig. 6 through the disks and wedge members when in assembled relation but removed from the valve body, while Fig. 10 is a section of these parts substantially on line D—D of Fig. 5. Figs. 11, 12 and 13 are respectively a front elevation and end views of the wedge member, and Fig. 14 is a section substantially on line E—E of Fig. 11. Fig. 15 is an elevation of the inner face of the driving disk removed from the valve; Fig. 16 is a similar view of the outer face thereof and Fig. 17 is a similar view of the inner face of the driven disk. Fig. 18 is a view substantially similar to Fig. 10 but showing a slightly different form of wedge member and associated wedging surfaces on the disks, while Fig. 19 is a section, substantially similar to Fig. 14, of the wedge member shown in Fig. 18. Figs. 20 and 21 are respectively an end elevation and a central vertical section on line F—F of Fig. 20 of a different type of valve constructed in accordance with my invention and embodying a different form of operating mechanism from that of the valve shown in the preceding figures. Fig. 22 is a view substantially corresponding to Fig. 5 but illustrating a different form of wedging mechanism and Fig. 23 is a fragmentary section on line G—G thereof. Fig. 24 is a side view of the driving and driven disks removed from the valve body and illustrating still another form of wedging mechanism, the wedge actuating stop carried by the valve body being indicated in section. Fig. 25 is a section on line H—H of Fig. 24 and Fig. 26 is an enlarged elevation of the wedge shown in Figs. 24 and 25. Fig. 27 is an enlarged fragmentary perspective view illustrating the preferred conformation of one of the wedging surfaces embodied in the valve shown in Figs. 1 to 3 inclusive and the detail figures relating thereto, and Fig. 28 is a somewhat diagrammatic sectional view substantially on the line K—K of said figure; the purpose of these two last mentioned views will hereinafter more fully appear. Similar symbols are used to designate like parts in the various figures and it will be understood that all sections are to be considered as taken in the direction indicated by the arrows on the section lines.

Referring now more particularly to the form of the invention illustrated in Figs. 1 to 17 inclusive the valve therein shown comprises a body formed in two parts generally designated as 1 and 2 and desirably separable substantially on the plane of the line B—B. These parts may be operatively secured together in any convenient way as by providing them with flanges 1', 2' for the passage of the bolts 3. The body is provided with a longitudinally extending through passageway 4 which may be flared outwardly at its ends to form throats 5 internally threaded at their outer extremities to receive the pipe in which the valve is positioned. The valve body is also provided with an internal cylindrical chamber 6 extending transversely of and surrounding the passageway 4, the opposite walls of this chamber, designated as 7 and 8, being parallel to each other and extending beyond the passageway in all transverse directions.

Within this chamber are disposed a pair of disks 9, 10 which rotate together as a unit when the valve is being opened and closed, each provided with a suitable port or ports which are permanently aligned with each other and which when brought into alignment with the passageway 4 afford communication through the valve. While any suitable number of ports may be arranged in each disk, ordinarily but a single port is employed, in which case it may be desirably made substantially semi-circular in form as best shown in Figs. 15 and 17; the port in the driving disk is designated as 11 and that in the driven disk as 12.

The driving disk has a peripheral rim 13 which forms a good fit in the cylindrical chamber 6 and, on its outer face, is provided with an annular bearing surface 14 adapted to bear against the adjacent wall 7 of the chamber, the face of which, as well as that of the bearing surface 14, is ground or otherwise suitably finished so that a tight seal can be formed between them.

Similarly to the driving disk, the driven disk is provided on its outer face adjacent its periphery with an annular bearing surface 15 adapted to bear against the adjacent wall 8 of the chamber 6 which forms a seat therefor. The driven disk is of somewhat smaller diameter than the driving disk and is arranged to nest within the latter, and to this end the driving disk may be annularly chamfered out on its inner face as at 16 and the driven disk provided with a flange 17 adapted to seat within the chamfer, the driven disk being thus prevented from sliding parallel to the face of the driving disk. In addition, means are provided for constraining the disks to rotate as a unit, said means preferably comprising a pair of lugs 18 projecting from the inner face of the driven disk and adapted to enter corresponding recesses 18' formed on the driving disk between lugs 19 suitably disposed thereon and a diametrically extending ridge or bar 20 disposed between the port 11 in the disk and a solid web 21 on the opposite side of the bar extending to the bearing surface 14. The outer face of this bar is disposed in the plane of said surface and similarly smoothly finished so as to bear against the chamber wall. while the web 21 is depressed below the level of the bar.

In like manner the driven disk 10 may be provided with a diametrically extending ridge or bar 22 on one side of which is located the port 12 and on the opposite side a solid web 23, the outer face of this bar lying in the plane of the bearing surface 15 and the web being depressed therebelow. It will thus be apparent that when the driven disk is nested or seated in the driving disk it is incapable of either sliding or turning movement with respect to the latter, the disks, however, being readily separable axially. Additionally, owing to the differences in diameters of the disks, an annular groove 24 is formed between the periphery of the driven disk and the marginal rim 13 of the driving disk. this groove being continuous save where it is interrupted at one point by the interposition of a lug 25 desirably integral with the driving disk and projecting into the groove, the function of which will hereinafter appear.

Any suitable means are provided for effecting rotation of the disks the particular embodiment thereof employed in the form of valve to which reference is now being made comprising a hand wheel 30 mounted outside of the valve body on a stem 31 which extends into the body through an adjustable gland 32 and stuffing box 33 and which at its inner end is provided with a bevel pinion 34 co-operative with a segmental bevel gear 35 formed on the outer face of the driving disk adjacent its periphery and outside of the bearing surface 14 the arrangement being such that rotation of the hand wheel is effective to turn the disks in the chamber 6 from one limit position to the other. To insure the proper alignment of the ports in the disks with the passageway 4 when the disks are turned to fully open position a stop 36 desirably formed integral with the body portion 2 is arranged in such position that it will enter the groove 24 and project in the path of the lug 25 carried by the driving disk for engagement by the lug so as to prevent the disks from being turned past fully open position when they are rotated thereto as shown in Fig. 1.

To support the thrust exerted by the bevel pinion 34 upon the driving disk in a direction substantially parallel to the axis of rotation of the latter, the face of the rim 13 of the driving disk is arranged to bear against a suitable bearing surface 38 formed on the body portion 2 and which I term the driving disk thrust seat and as the periphery of the driving disk forms a snug though easily slidable fit in the chamber 6 the disk is prevented from movement transverse to its axis of rotation and proper engagement between the gearing on the disk and the pinion continuously maintained.

The disk separating means in the form of valve now being described comprise a wedge, generally designated as 40, provided with spaced oppositely inclined wedge surfaces 41, 42 and an operating arm 43 having at its outer extremity a head 44 of somewhat greater length than the width of the arm and projecting from the opposite side of the wedge from that on which the wedging surfaces are disposed; this head is adapted to align with the groove 24 when the parts are assembled. The wedging surfaces 41, 42 are respectively adapted to cooperate with correspondingly spaced wedge surfaces 45, 46 disposed on the web portion 21 of the driving disk 9 and desirably arranged symmetrically, or substantially, so to that diameter of the disk which is normal to the bar 20. While under most conditions I prefer to employ two wedge surfaces on the wedge 40 and a similar number of surfaces on one of the disks, for example, the driving disk as just described and as best shown in Figs. 12 to 15 inclusive, under certain conditions it may be deemed desirable to provide the wedge with wedging surfaces on both sides and to correspondingly provide each of the disks with a pair of wedging surfaces for cooperation with those on the adjacent side of the wedge when the wedge is assembled between the disks, an arrangement of this character being shown in Figs. 18 and 19 and requiring no further description. However, where but a single pair of wedging surfaces are provided on the wedge and arranged for cooperation with corresponding surfaces on one of the disks, I may provide the other disk, for example and as shown, the driven disk, with a pair of pads 47, 48 on its webbed portion 23 so disposed that they will respectively substantially align with the wedging surfaces 45, 46 upon the other disk when the parts are assembled to thereby form abutments for engagement by the opposite face of the wedge from that on which the wedging surfaces 41, 42 are arranged. It will of course be understood that when wedging surfaces are provided on both sides of the wedge these pads will be replaced by suitable wedging surfaces as above described.

At this point it should be noted that while I usually prefer to utilize wedging surfaces of helical contour both on the disk or disks and on the wedge, I may employ other forms of surfaces in accordance with the results which it is desired to attain or particular conditions which are to be met. It will, moreover, be noted that the wedging surface 42 on the wedge and corresponding surface 46 on the disk are desirably so formed as to interengage or nest together, the wedging surface 46 being preferably such that a cross section therethrough presents a substantially blunt V-shaped contour and the surface 42 being correspondingly V-shaped. When using surfaces of this character I usually deem it desirable to make the slope of the transversely and oppositely inclined faces of the surface 46 approximately the same as the slope of the said wedging surface itself with respect to the face of the disk and, of course, to correspondingly slope the faces of the cooperating wedge surface 42 on the wedge. This point will perhaps be more clearly brought out by reference to Figs. 27 and 28 from which it will be noted that in accordance with this construction the slope of the opposite faces of the wedging surface 46 from its center line K—K as measured by the angles X and Y is substantially equal and, further, that each of the said angles is substantially equal to the angle formed by the line K—K with the face of the web 21 on which the wedge surface is formed. When the parts are so constructed the wedging severity or effort of the interfitting surfaces 42 and 46 is substantially the same when the wedge is pivoting thereupon as a center, as hereinafter described, as when the wedge is rising on the surface 46 when the wedge is pivoting about some other point as, for example, some point on the surface 45 while performing its wedging function. It will thus be understood that while I have found certain forms and arrangements of the wedging surfaces to be preferred under most conditions, I do not desire or intend to limit myself to the employment of any particular form or type of surfaces or arrangement thereof or to any particular interfitting relation therebetween or to any precise inclination of slope thereof or ratio or relation between the inclination or slope of the said surfaces and any parts thereof.

It will be understood that when the parts are in operatively assembled relation the wedge 40 is disposed between the disks 9 and 10 in the space formed between the adjacent faces of the webs 21 and 23 with the wedging surface 41 resting upon the corresponding surface 45 and the wedging surface 42 and the corresponding surface 46. Under these conditions the operating arm 43 of the wedge extends outwardly beyond the periphery of the driven disk, the rim of which is suitably cut away as at 50 to permit the passage of the arm, while a recess 51 in the driving disk 9 is provided for the reception of the outer end of the arm and the head 44, the parts being preferably so arranged that the projecting ends 44' of the head can pass into the groove 24 if required. The head 44 of the wedge is therefore aligned with the groove 24 into which the lug 36 also projects as hereinbefore described. The cut away portion 50 of the driven disk and the recess 51 in the driving disk are sufficiently wide to afford a certain amount of clearance on each side of the operating arm to permit movement of the wedge relatively to the dis. during the performance of its wedging function.

Reference may now be made to the operation of the valve when the parts are constructed and assembled substantially as hereinbefore described: Assuming the valve is open, the parts occupy the general position shown in Figs. 1 and 2 and engagement of the lug 25 with the stop 36 thus serves to prevent rotation of the hand wheel save in a direction which will operate to turn the disks toward closed position. Under these conditions and, in fact, save during the actual sealing and unsealing of the valve, the floating wedge occupies, with respect to the driving disk and other parts, substantially the position shown in Fig. 4 with its operating arm extending about at right angles to the cross bar 20; this position of the wedge may therefore be conveniently referred to as its normal position. Upon rotation of the hand wheel 30 in a direction to close the valve, the driving and driven disks, which by reason of their inter-engagement are constrained to rotate as a unit, are revolved in the direction indicated by the arrow in Fig. 4 until the head 44 of the wedge is brought into engagement with the opposite end of the stop 36 from that which is engaged by the lug 25 when the valve is fully open, the parts when this condition is reached assuming substantially the position shown in Fig. 5 in which it will be noted the disk has revolved through a little less than 180° but sufficiently to bring the ports in the disks out of alignment with the passageway 4 and the solid web portions of the disks into alignment therewith to thereby close but not seal the valve. Until its contact with the stop 36 the wedge remains in normal position and if rotation of the disk was discontinued at the very moment the said engagement was established the wedge would not move therefrom or function to effect the sealing of the valve, and it will thus be apparent that as the disks are readily rotatable by suitable manipulation of the disk driving mechanism from open to closed yet unsealed position and vice versa, and that as during this movement of the disks in either direction the wedge remains undisturbed in its normal or non-sealing position, it is impossible for the wedge to be actuated to seal the valve before the disks have attained a position in which they close the passageway 4.

However, the moment that the head of the wedge engages stop 36 it can no longer be carried around by the disks in its normal position; consequently if the rotation of the disks is continued in the same direction, the wedge is compelled to move relative to and between the disks and thus caused to ride up upon the wedging surfaces 45 and 46, the head of the wedge of course continuously remaining in contact with the stop. Under these conditions it will be observed that as the wedge surfaces 45, 46 and the cooperating surfaces on the wedge slope in opposite directions, the continued movement of the disks causes both cooperative pairs of wedges to tighten thereby forcing the disks axially apart and bringing their outer faces into intimate engagement with the respective seating surfaces on the body of the valve. Moreover, if the cooperating wedge pairs do not tighten simultaneously, that wedge pair presenting the greater resistance to movement automatically becomes a pivoting point about which the wedge 40 turns until the resistance afforded by the other wedge pair equals or exceeds the resistance of the first pair so that each pair in turn is free to automatically become the pivoting point for the floating wedge until the cooperating pairs are selectively and progressively tightened and substantially uniform pressure secured between the disks and their seats throughout their respective contacting areas. Thus as the disks are progressively rotated the wedging action is correspondingly increased so that the force with which the disks are pressed against their respective seating surfaces is directly under the control of the operator, the greater the power applied to the hand wheel or other means from which the rotation of the disks is effected the greater being the force with which the disks are separated.

It will be apparent that the slope or angle of inclination of the wedging surfaces determines the severity of the wedging action exerted by the application of a given amount of power, said action becoming less severe as the slope of the surfaces is increased. However, while the said angle may be varied in accordance with the results desired, I prefer to so slope or incline the wedging surfaces that after desired sealing pressure has been attained the parts will remain stationary to thereby maintain such pressure and consequent seal even though the turning force on the hand wheel or other disk actuating means be reduced or entirely removed and, in fact, until the wheel be positively turned so as to slightly rotate the disks in a direction opposite to that in which they were rotated while the valve was being closed, thus positively relieving the pressure between the wedge 40 and the stop 36. This permits a slight relative movement to take place between the wedging surfaces on the disk and on the wedge with consequent return of the latter to normal or substantially normal position, thus breaking the seal between the disks and the body preparatory to the disks being rotated to open position. It should be noted, however, that this automatic movement of the wedge as the seal is broken is only great enough to relieve the sealing pressure, so that subsequent to the breaking of the seal the wedge merely assumes a position in which it is effective to preserve a sliding, as distinguished from a sealing, contact between the disks and cooperating sealing surfaces on the body with the result that throughout the rotative movement of the disks in either direction it is impossible for grit or other foreign substances to enter between said surfaces which are thus at all times preserved from abrasion or undue wear.

The various positions assumed by the wedge as the disks are rotated from fully open to fully closed and sealed position are best indicated in Figs. 4 to 7 inclusive. In Fig. 4 the wedge is shown in normal position with the valve fully open; in Fig. 5 the disks have been rotated so as to close the valve and just bring the head of the wedge into engagement with stop 36; in Fig. 6 the disks have been rotated a little further in the same direction and, it will be noted, the wedge has turned slightly on the wedging surface 45 as a center, it being assumed for purposes of illustration that temporarily greater resistance to the movement of the wedge is afforded between the wedging surfaces 41 and 45 than between the surfaces 42 and 46. As the movement of the disks is continued, however, from the position shown in Fig. 6 to that shown in Fig. 7, it is further assumed that this resistance is first equalized between all of the said surfaces and thereafter that a greater resistance is presented between the surfaces 42 and 46 than between surfaces 41 and 45 so that the pivotal point of the wedge shifts to the former of said surfaces with consequent slippage between the latter, the assumed directions of movements of the wedge in these two figures being indicated by the small arrows. It is of course, however, to be understood that said figures are illustrative merely and that the wedge does not always necessarily move in the directions indicated but simply that the wedge is at all times free to adjust itself progressively and selectively in accordance with the resistance encountered or afforded by the different pairs of wedging surfaces and that it will thus ordinarily alternately swing or pivot on the different pairs of surfaces while performing its wedging function.

The principles of my invention may, with equal facility, be employed in types or forms of valves other than those heretofore described, and to a few of these I will now briefly refer by way of illustration merely. Thus, for example, in Figs. 20 and 21 I have shown a valve substantially similar to the forms to which I have previously referred with respect to the arrangement of the sealing disks and wedging mechanism but provided at both of its ends with flanges 60 to facilitate its connection in the line and with a different form of disk operating mechanism which is effective to increase the turning ratio between the disks and the operating handle or lever 61, which replaces the hand wheel 30. In this form of the invention the driving disk 9 is provided with spur gear teeth 62 on its periphery, instead of with bevel teeth, which are cooperative with a pinion 63 disposed on a short shaft 64 mounted on the body, leakage about the shaft being prevented by an adjustable stuffing gland 65. The shaft 64 is also operative to support another pinion 66 which meshes with an internal segmental gear 67 formed in a disk-like member 68 rotatable on a spindle 69 carried by the casing and to which the operating lever 61 is connected. Thus by moving the lever from one position to another the requisite rotation of the disks to open and close the valve may be readily effected, the extent of movement of the lever necessary for this purpose being of course determined by the ratio of the gear train through which its movement is communicated to the disks. This form of valve is found to be particularly satisfactory in the larger sizes and also where a rapid opening and closing of the valve is desirable, while as a train of spur gears is employed between the operating handle and the disks instead of bevel gearing, the driving disk is relieved from any axial thrust.

In Figs. 22 to 26 inclusive I have shown other forms of wedging means which may be utilized if desired and which I have found to be advantageous in certain types of valves and more particularly in the smaller sizes. Thus, in the structure shown in Figs 22 and 23 the valve body is provided with a radially operative cam surface 70 which is adapted to engage the outer end of a radially movable wedge 71 to force the latter between wedging surfaces 72 disposed on the inner faces of the disks for cooperation therewith, these surfaces being preferably of such slope or inclination as to automaticaly release the wedge from sealing position upon the initial movement of the disks toward open position. To accommodate the outer extremity of the wedge during the opening and closing of the valve, the body of the latter is cut out between the cam surface 70 and a point substantially diametrically opposite thereto to form a groove 75 in which the end of the wedge can travel when the wedge is in normal position. The shoulder 76 formed at the end of this groove opposite to the cam surface 70 thus forms a stop effective, like the stop 36, to prevent rotation of the disks past fully open position by engagement with the end of the wedge when the disks have been rotated thereto. While wedging surfaces in this form of the invention will ordinarily be provided on both sides of the wedge and similar cooperating surfaces on the inner faces of both disks, it will be understood that, if desired, the wedge may have a wedging surface on one side only cooperative with a corresponding surface on the adjacent disk while the other side of the wedge is made flat and the disk adjacent thereto correspondingly flattened or provided with a flat pad like the pads 47 and 48.

In the form of the invention shown in Figs. 24 to 26, inclusive, the driving disk 9 is provided with a wedge surface 80 which is cooperative with a corresponding surface 81 on a wedge 82 pivoted at some convenient point at or near the center of the disks and which, at its outer end, may be provided with a head 83 adapted to travel in the groove 24 and to engage the stop 36 on the valve body. Thus, when the head reaches the stop during the closing of the valve, further rotative movement of the wedge with the disks is prevented and during the subsequent movement of the latter in the same direction the wedging action is effected between the surface 81 on the wedge and the cooperating wedging surface 80 on the driving disk to thereby separate the disks axially.

While I have herein illustrated and described certain forms of my invention with considerable particularity, I do not thereby desire or intend to specifically limit or confine myself thereto as numerous changes and modifications may be made in the design, construction and arrangement of the various parts if considered desirable while the principles of the invention may be readily adapted to and embodied in valves of forms other than those to which I have chosen to refer without departing from the spirit and scope of the invention as defined in the appended claims.

Having thus described my invention, I claim and desire to protect by Letters Patent of the United States:—

1. A valve comprising a body having a through passageway, a chamber about and communicating with the passageway, and sealing faces on opposite sides of the chamber, a pair of ported sealing disks adapted to rotate together to open and to closed position, and at closed position incapable of relative movement in their plane of rotation but relatively movable perpendicular thereto to be sealed against said sealing faces, means for rotating the disks, and means disposed between the disks and operable to separate the disks and force them against said faces to seal the valve in closed position.

2. A valve comprising a body having a through passageway and opposed sealing faces surrounding and disposed transversely of the passageway, a pair of ported sealing disks adapted to rotate together in mechanical contact with said sealing faces to open and to closed position, and at closed position to be sealed against said faces, means for rotating the disks, wedging means disposed between the disks and including a movable wedge member operable by movement of the disks to force the disks apart against said sealing faces to thereby seal the valve in closed position.

3. A valve comprising a body having a through passageway and sealing faces disposed about and extending transversely of the passageway, a pair of ported disks adapted to rotate together in mechanical contact with said faces to open and to close said passageway and at closed position to be sealed against said faces, means for rotating the disks, a wedge member disposed between the disks, relatively movable with respect thereto and normally rotatable therewith, and means engageable by the wedge member when the disks are rotated to a predetermined position to restrain the wedge member from further rotation with the disks and thereby effect axial separation of the disks during their subsequent rotation to seal the disks against said sealing faces.

4. A valve comprising a body having a through passageway and sealing faces on opposite sides of a transverse chamber communicating therewith, a pair of ported disks adapted to rotate together in mechanical contact with said faces to open and close said passageway and at closed position to be sealed against said faces, means for rotating the disks, a wedge carried by one of the disks, a wedge member cooperative therewith, relatively movable with respect to and normally rotatable with the disks, and means disposed for engagement by the wedge member when the disks are rotated to a predetermined position to prevent further rotation of the wedge member with the disks and thereby effect relative movement between the wedge and the wedge member during further rotation of the disks in the same direction to separate the disks axially and force them against said sealing faces, the slope of the cooperating surfaces of the wedge and wedge member being such that upon a very slight rotation of the disks in the opposite direction the wedge and the wedge member will automatically release the axial pressure theretofore exerted on the disks.

5. A valve comprising a body having a through pasageway, a transversely disposed chamber communicating therewith and having sealing faces on opposite sides, a pair of ported disks adapted to rotate together in the chamber in sliding contact with said faces to open and close said passageway and at closed position to be sealed against said faces, means for rotating the disks, an inclined surface on one of the disks, a wedge member having a complementary inclined surface cooperable therewith, said member being relatively movable with respect to the disks and normally rotatable therewith, and a stop engageable by the wedge member when the disks are rotated to a predetermined position to prevent further rotation of the member with the disks whereby, during such further rotation, the wedge member is caused to ride up on the inclined surface of the disk to separate the disks axially and seal them against said sealing faces, the inclination of said cooperating inclined surfaces being such that upon a slight rotation of the disks in the opposite direction the axial sealing pressure thereon is automatically released.

6. A valve comprising a body having a through passageway and sealing faces on opposite sides of a transverse chamber communicating therewith, a pair of ported disks in said chamber constrained to rotate together as a unit in either direction in sliding contact with said faces to open and close the passageway and at closed position to be respectively sealed against said faces, means for rotating the disks, a stop on the body, a wedge member disposed between the disks and adapted to cooperate with the stop to force the disks against said sealing faces when the disks are rotated to closed position, and a lug on one of the disks adapted to engage with the stop on the body so that all ports in the disks will be caused to register with the passageway in the body when the disks are in open position.

7. A valve comprising a body having a through passageway and sealing faces on opposite sides of a transverse chamber communicating therewith, a pair of ported disks in the chamber adapted to rotate together in sliding contact with said faces to open and close the passageway and at closed position to be respectively sealed against said faces, means for rotating the disks, a stop on the body, a wedge member disposed between the disks and adapted to cooperate with the stop to force the disks against said sealing faces when said disks are rotated to closed position, and means operative to prevent the rotation of either disk independently of the other and insure alignment of the ports in the disks and said passageway when the disks are in open position.

8. A valve comprising a body having a through passageway and sealing faces on opposite sides of a transverse chamber communicating therewith, a pair of ported disks adapted to rotate together in sliding contact with said faces to open and to closed position and at closed position to be respectively sealed against said faces, means for rotating the disks, a lug upon one of the disks engageable with a part of the body to limit rotation of the disks in one direction, and a wedge separating mechanism carried by the disks and engageable with the same part of the body when the disks are rotated in the opposite direction to thereupon wedge the disks against the sealing faces.

9. A valve comprising a body having a through passageway and sealing faces on opposite sides of a transverse chamber communicating therewith, a pair of ported disks adapted to rotate together in mechanical contact with said faces to open and close the passageway, means for rotating the disks, spaced wedging surfaces on one of the disks and a floating wedge member adapted to pivot upon either of the wedging surfaces according to the alternate and progressive resistance met and operable by rotative movement of the disks to separate the disks axially to seal them against said faces when the disks are in closing position.

10. A valve comprising a body having a through passageway and sealing faces on opposite sides of a transverse chamber communicating therewith, a pair of ported disks adapted to rotate together in mechanical contact with said faces to open and close said passageway and at closed position to be sealed against said opposite faces, means for rotating one of the disks, wedging surfaces spaced on opposite sides of the axis of one of the disks on that face thereof directed toward the other disk, a wedge member cooperative with said wedging surfaces, and means engageable by the wedge member when the disks are rotated past a predetermined position to cause the wedge member to ride on said surfaces to force the disks axially apart against said sealing faces, the movement of the wedge member while so operating being determined by the resistance thereto which it progressively encounters.

11. A valve having a body having a through passageway and sealing faces on opposite sides of a transverse chamber communicating therewith, a pair of ported disks adapted to rotate together in the chamber in sliding contact with said faces to open and close the valve, means for rotating the disks, and floating wedge means operable to separate the disks axially and force them respectively against the adjacent sealing faces with uniformly distributed pressure.

12. In a valve, a body having a through passageway, a chamber disposed transversely of the passageway, the opposite walls of the chamber forming annular sealing surfaces, a pair of ported disks adapted to rotate together in contact with said surfaces, means for rotating the disks, and cooperating wedge means located in part upon one of the disks and in part separate therefrom operable to cause axial separation of the disks to seal them against said surfaces after the disks are rotated to a predetermined position.

13. In a valve, a body having a chamber and a through passageway communicating therewith, a pair of oppositely facing ported disks restrained from rotative movement with respect to each other but adapted to rotate as a unit in said chamber and across said passageway, driving means for the disks, and means for forcing the disks apart when the disks are rotated past a predetermined point in a given direction.

14. In a gate valve, a valve body having a through passageway, a transversely disposed chamber about the passageway and communicating therewith and sealing faces within said chamber, a pair of ported disks adapted to turn within said chamber across the passageway and to be sealed against the faces when in closed position, and a floating selective wedge member for forcing the disks apart to effect said seal and adapted to cooperate with a plurality of wedge surfaces carried by one of the disks according to the resistance to turning movement which the wedge member progressively encounters.

15. In a gate valve, a valve body having a through passageway, a transversey disposed chamber about the passageway and sealing faces within said chamber adjacent the passageway, a pair of disks adapted to turn within the chamber, means for preventing the turning of either disk independently of the other, wedges upon one of the disks spaced angularly about the disk, and cooperating wedges engaging the first named wedges and operable to separate the disks positively at a plurality of points.

16. In a gate valve, a valve body having a through passageway, a transversely disposed chamber surrounding the passageway, a disk rotatable within said chamber and guided therein by the walls thereof, a second disk nested within the first disk and connections between the disks whereby rotation of the first disk effects rotation of the other disk at the same angular rate throughout its possible rotative movement.

17. In a gate valve, a valve body having a through passageway and a transversely disposed chamber surrounding the passageway, a disk rotatable within said chamber and guided therein by the walls thereof, a second disk nested within the first disk, connections between the disks whereby rotation of the first disk effects rotation of the other disk at the same angular rate throughout its rotative movement, and means operative to separate the disks axially when rotated in a predetermined direction past a given point.

18. A valve comprising a body having a through passageway and sealing faces on opposite sides of a transverse chamber communicating therewith, a pair of ported disks in said chamber adapted to rotate together in sliding contact with said faces to open and close the passageway and at closed position to be respectively sealed against said faces, means for rotating the disks, a stop on the body, and a wedge member disposed between the disks and adapted to cooperate with the stop to force the disks against said sealing faces when the disks are rotated to closed position and to relieve the sealing pressure as the disks are rotated in the opposite direction.

In witness whereof, I have hereunto set my hand this 23d day of January, 1928.

CHARLES H. SCHMALZ.